US012215296B2

(12) United States Patent
Omata et al.

(10) Patent No.: US 12,215,296 B2
(45) Date of Patent: Feb. 4, 2025

(54) GREASE COMPOSITION, HEATING DEVICE, AND ELECTROPHOTOGRAPHIC IMAGE FORMING APPARATUS

(71) Applicant: CANON KABUSHIKI KAISHA, Tokyo (JP)

(72) Inventors: Masahito Omata, Kanagawa (JP); Hideo Nanataki, Kanagawa (JP); Yasuharu Notoya, Tokyo (JP); Norihiko Ochi, Kanagawa (JP); Fuyuko Koyama, Kanagawa (JP); Yoshihito Oshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 18/187,303

(22) Filed: Mar. 21, 2023

(65) Prior Publication Data

US 2023/0303944 A1 Sep. 28, 2023

(30) Foreign Application Priority Data

Mar. 24, 2022 (JP) ................................ 2022-048347
Mar. 14, 2023 (JP) ................................ 2023-039697

(51) Int. Cl.

| | |
|---|---|
| ***G03G 15/20*** | (2006.01) |
| ***C10M 107/38*** | (2006.01) |
| ***C10M 107/44*** | (2006.01) |
| ***C10M 119/22*** | (2006.01) |
| ***C10M 169/02*** | (2006.01) |

(Continued)

(52) U.S. Cl.

CPC ........ *C10M 169/02* (2013.01); *C10M 107/38* (2013.01); *C10M 107/44* (2013.01); *C10M 119/22* (2013.01); *G03G 15/2025* (2013.01); *C10M 2213/0606* (2013.01); *C10M 2213/0626* (2013.01); *C10M 2217/0443* (2013.01); *C10N 2020/02* (2013.01); *C10N 2040/24* (2013.01);

(Continued)

(58) Field of Classification Search

CPC ........... G03G 15/2025; C10M 107/38; C10M 107/44; C10M 119/22; C10M 169/02
USPC ......................................... 399/122, 320, 328
See application file for complete search history.

(56) References Cited

U.S. PATENT DOCUMENTS

| | | | | |
|---|---|---|---|---|
| 11,054,773 | B2 * | 7/2021 | Furuichi ............ | G03G 15/2057 |
| 2021/0054300 | A1 | 2/2021 | Oshimia et al. | |

FOREIGN PATENT DOCUMENTS

| | | | |
|---|---|---|---|
| JP | H02123385 | A | 5/1990 |
| JP | H0444075 | A | 2/1992 |

(Continued)

*Primary Examiner* — Hoan H Tran

(74) *Attorney, Agent, or Firm* — Canon U.S.A., Inc. I.P. Division

(57) ABSTRACT

A heating device including: a rotating member for heating, an opposing member, which is arranged so as to be opposed to the rotating member, and forms a nip portion together with the rotating member, and a biasing member, which is arranged inside the rotating member, has an opposing surface with respect to an inner peripheral surface of the rotating member, and biases the rotating member to the opposing member. The inner peripheral surface and the opposing surface are brought into contact with each other via a grease composition to form a sliding portion. The grease composition contains a base oil. The base oil contains a fluoropolymer having a specific structure and a perfluoropolyether having a specific kinematic viscosity and a specific evaporation loss and having a specific structure.

14 Claims, 7 Drawing Sheets

(51) Int. Cl.

| | |
|---|---|
| *C10N 20/02* | (2006.01) |
| *C10N 40/20* | (2006.01) |
| *C10N 40/24* | (2006.01) |
| *C10N 50/10* | (2006.01) |

(52) U.S. Cl.
CPC .... *C10N 2040/242* (2020.05); *C10N 2050/10* (2013.01)

(56) References Cited

FOREIGN PATENT DOCUMENTS

| | | | |
|---|---|---|---|
| JP | H0527619 | A | 2/1993 |
| JP | H0876636 | A | 3/1996 |
| JP | 2015222424 | A | 12/2015 |
| JP | 2016218221 | A | 12/2016 |
| JP | 2018016686 | A | 2/2018 |
| JP | 2020020965 | A | 2/2020 |
| JP | 2020134744 | A | 8/2020 |
| JP | 2021036034 | A | 3/2021 |
| JP | 2022023600 | A | 2/2022 |
| JP | 2022029238 | A | 2/2022 |

* cited by examiner

GREASE COMPOSITION, HEATING DEVICE, AND ELECTROPHOTOGRAPHIC IMAGE FORMING APPARATUS

BACKGROUND

Technical Field

The present disclosure relates to a grease composition, a heating device, and an electrophotographic image forming apparatus.

Description of the Related Art

In an electrophotographic image forming apparatus (hereinafter sometimes referred to as "image forming apparatus") utilizing an electrophotographic process, a toner image formed of a toner on a photosensitive member is transferred onto a recording medium and then fixed (firmly fixed) onto the recording medium by passing through a heating device. As the heating device, there has been widely used a contact type heating device, which is a fixing member heated to a predetermined fixing temperature by a heating member and fixes an unfixed toner image formed on the recording medium as a fixed image by contact heating. As a typical heating device, there is given a film heating type heating device described in each of Japanese Patent Application Laid-Open No. H05-027619 and Japanese Patent Application Laid-Open No. H08-076636.

A film is slid with the heating member while receiving heat from the heating member at the time of drive of the film heating type heating device. In addition, a heat-resistant lubricant is used between the film and the heating member in order to reduce friction. A fluorine-based oil or a fluorine-based grease having high heat resistance is generally used as the lubricant. Specifically, a fluorine-based grease or a silicone oil is used as the lubricant in Japanese Patent Application Laid-Open No. H05-027619, and a fluorine-based grease or the like is used as the lubricant in Japanese Patent Application Laid-Open No. H08-076636.

Incidentally, in an electrophotographic image forming apparatus including a heat fixing device that heats a recording material bearing a toner image, ultrafine particles may be generated from a toner and grease due to the effect of heat when the heat fixing device heats the recording material bearing the toner image. In Japanese Patent Application Laid-Open No. 2020-020965, there is a disclosure of an electrophotographic image forming apparatus capable of preventing the emission of such ultrafine particles to the outside of the electrophotographic image forming apparatus. Specifically, there is a disclosure of an electrophotographic image forming apparatus, which includes a detection portion for ultrafine particles each having a first particle diameter and a detection portion for ultrafine particles each having a second particle diameter larger than the first particle diameter, and which performs control for suppressing the emission of the ultrafine particles to the outside of the apparatus based on information regarding the amount of the ultrafine particles indicated by the detection results of the detection portions.

In the electrophotographic image forming apparatus disclosed in Japanese Patent Application Laid-Open No. 2020-020965, the emission of the ultrafine particles to the outside of the apparatus can certainly be prevented. However, the installation of the detection portions for the ultrafine particles and the mounting of a control unit for reducing the amount of the ultrafine particles may lead to increases in size and cost of the electrophotographic imaging forming apparatus.

SUMMARY

At least one aspect of the present disclosure is directed to providing a heating device and an electrophotographic image forming apparatus that can prevent the generation itself of ultrafine particles caused by grease. Further, at least one aspect of the present disclosure is directed to providing a grease composition that can prevent the generation of ultrafine particles even when heated.

According to at least one aspect of the present disclosure, there is provided a heating device including: a rotating member for heating; an opposing member, which is arranged so as to be opposed to the rotating member, and forms a nip portion together with the rotating member; and a biasing member, which is arranged inside the rotating member, has an opposing surface with respect to an inner peripheral surface of the rotating member, and is configured to bias the rotating member to the opposing member, wherein the inner peripheral surface and the opposing surface are brought into contact with each other via a grease composition to form a sliding portion, wherein the grease composition contains a base oil, wherein the base oil contains a fluoropolymer and a perfluoropolyether, wherein the fluoropolymer has a structure represented by the following formula (1), wherein the perfluoropolyether has an evaporation loss of 0.05 to 2.0 mass % at a point of 260° C. in a thermogravimetric reduction curve obtained when the perfluoropolyether is increased in temperature from 25° C. at 10° C./min under a nitrogen atmosphere, wherein the perfluoropolyether has a kinematic viscosity at a temperature of 40° C. of from 0.5 $cm^2/s$ to 15 $cm^2/s$, and wherein the perfluoropolyether includes a perfluoropolyether having any one structure selected from the group consisting of structures represented by the following formulae (2) to (4):

formula (1)

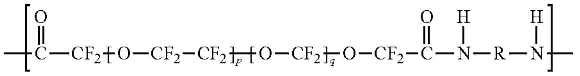

in formula (1), R represents an alkylene group, p and q each independently represent a positive number, and p+q is such a value that a kinematic viscosity at a temperature of 40° C. of the fluoropolymer satisfies from $1.0\times10^3$ $cm^2/s$ to $1.0\times10^5$ $cm^2/s$;

formula (2)

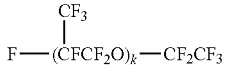

in formula (2), k represents a positive number, and k is such a value that the kinematic viscosity at a temperature of 40° C. of the perfluoropolyether satisfies from 0.5 $cm^2/s$ to 15 $cm^2/s$;

$$—CF_3—(OCF_2CF_2)_{m1}—(OCF_2)_{n1}—CF_3 \qquad \text{formula (3)}$$

in formula (3), m1 and n1 each independently represent a positive number, and m1+n1 is such a value that the kinematic viscosity at a temperature of 40° C. of the perfluoropolyether satisfies from 0.5 $cm^2/s$ to 15 $cm^2/s$;

$$F—(CF_2CF_2CF_2O)_{n2}—CF_2CF_3 \quad \text{formula (4)}$$

in formula (4), n2 represents a positive number, and n2 is such a value that the kinematic viscosity at a temperature of 40° C. of the perfluoropolyether satisfies from 0.5 $cm^2/s$ to 15 $cm^2/s$.

In addition, according to at least one aspect of the present disclosure, there is provided an electrophotographic image forming apparatus including the above-mentioned heating device.

Further, according to at least one aspect of the present disclosure, there is provided a grease composition including a base oil, wherein the base oil contains a fluoropolymer and a perfluoropolyether, wherein the fluoropolymer has a structure represented by the following formula (1), wherein the perfluoropolyether has an evaporation loss of 0.05 to 2.0 mass % at a point of 260° C. in a thermogravimetric reduction curve obtained when the perfluoropolyether is increased in temperature from 25° C. at 10° C./min under a nitrogen atmosphere, wherein the perfluoropolyether has a kinematic viscosity at a temperature of 40° C. of from 0.5 $cm^2/s$ to 15 $cm^2/s$, and wherein the perfluoropolyether includes a perfluoropolyether having any one structure selected from the group consisting of structures represented by the following formulae (2) to (4):

formula (1)

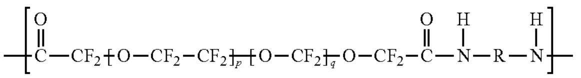

in formula (1), R represents an alkylene group, p and q each independently represent a positive number, and p+q is such a value that a kinematic viscosity at a temperature of 40° C. of the fluoropolymer satisfies from $1.0\times10^3$ $cm^2/s$ to $1.0\times10^5$ $cm^2/s$;

formula (2)

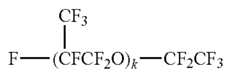

in formula (2), k represents a positive number, and k is such a value that the kinematic viscosity at a temperature of 40° C. of the perfluoropolyether satisfies from 0.5 $cm^2/s$ to 15 $cm^2/s$;

$$CF_3—(OCF_2CF_2)_{m1}—(OCF_2)_{n1}—CF_3 \quad \text{formula (3)}$$

in formula (3), m1 and n1 each independently represent a positive number, and m1+n1 is such a value that the kinematic viscosity at a temperature of 40° C. of the perfluoropolyether satisfies from 0.5 $cm^2/s$ to 15 $cm^2/s$;

$$F—(CF_2CF_2CF_2O)_{n2}—CF_2CF_3 \quad \text{formula (4)}$$

in formula (4), n2 represents a positive number, and n2 is such a value that the kinematic viscosity at a temperature of 40° C. of the perfluoropolyether satisfies from 0.5 $cm^2/s$ to 15 $cm^2/s$.

Further features of the present disclosure will become apparent from the following description of exemplary embodiments with reference to the attached drawings.

DESCRIPTION OF THE EMBODIMENTS

Exemplary embodiments of the present disclosure are described below.

Electrophotographic Image Forming Apparatus

Figure 2:
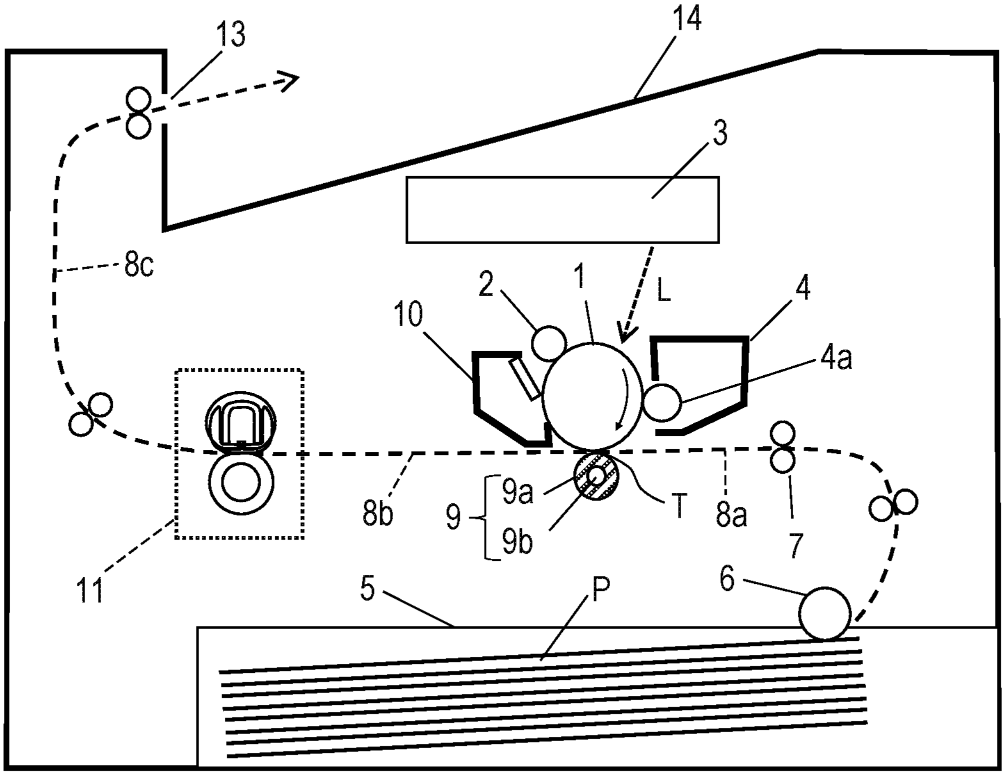
FIG. 2 is a schematic sectional view of an image forming apparatus according to one aspect of the present disclosure.

FIG. 2 is a schematic sectional view of an image forming apparatus having mounted thereon a heating device according to one aspect of the present disclosure. The image forming apparatus is a laser beam printer that forms an image on a recording medium P through use of a transfer type electrophotographic process.

An electrophotographic photosensitive drum 1 (hereinafter referred to as "drum") serving as an image bearing member in an image forming portion is driven to rotate at a predetermined peripheral speed (process speed) in a clockwise direction (arrow direction). The surface of the drum 1 is uniformly subjected to charging treatment (primary charging) with a predetermined polarity and potential by a charging unit 2, for example, a contact charging roller. A laser beam scanner 3 serving as an image exposure unit outputs laser light L that has been on/off modulated in accordance with a time-series electric digital pixel signal of intended image information input from external equipment, such as an image scanner and a computer (not shown), and subjects the charging treatment surface of the drum 1 to scanning exposure (irradiation). As a result of the scanning exposure, the charge in an exposure bright section of the surface of the drum 1 is removed, and an electrostatic latent image corresponding to the intended image information is formed on the surface of the drum 1. A developing device 4 supplies a recording material (toner) from a developing sleeve 4*a* to the surface of the drum 1 to sequentially develop the electrostatic latent image formed on the surface of the drum 1 as a toner image that is a transferable image. In the case of the laser beam printer, a reversal development system that develops the electrostatic latent image by causing the toner to adhere to the exposure bright section of the electrostatic latent image is generally used.

The recording media P, for example, sheets of paper are loaded and stored in a sheet feed cassette 5. A sheet feed roller 6 is driven based on a sheet feed start signal, and the recording media P in the sheet feed cassette 5 are separated and fed one by one. Then, the recording medium P passes between registration rollers 7 and through a sheet path 8*a* to be introduced into a transfer site T that is an abutment nip portion between a transfer roller 9 serving as a contact type/rotating type transfer member and the drum 1 at a predetermined timing. That is, the conveyance of the recording medium P is controlled by the registration rollers 7 so that, when the distal end portion of the toner image on the drum 1 reaches the transfer site T, the distal end portion of the recording medium P also reaches the transfer site T in time.

The recording medium P introduced into the transfer site T is held and conveyed through the transfer site T. During this time, a transfer voltage (transfer bias) controlled in a predetermined manner is applied to the transfer roller 9 from a transfer bias application power source (not shown). The transfer roller 9 and applied transfer voltage control are described later. When the transfer bias having a polarity opposite to that of the toner is applied to the transfer roller 9, the toner image formed on the surface of the drum 1 is electrostatically transferred onto a surface of the recording medium P at the transfer site T. The recording medium P having the toner image transferred thereon is separated from the drum 1. After that, the recording medium P is conveyed and introduced into a heating device 11 through a sheet path 8*b*, and is subjected to heating and pressure-fixing treatment of the toner image. Meanwhile, the surface of the drum 1 after the separation of the recording medium (after the transfer of the toner image onto the recording medium P) is repeatedly subjected to image forming after transfer residual toner, paper dust, and the like are removed by a cleaning device 10. The recording medium P having passed through the heating device 11 is guided in a course to a sheet path 8*c* side and delivered from a delivery port 13 onto a delivery tray 14.

For example, an elastic roller including a conductive metal core 9*b* formed of, for example, stainless steel (SUS) or Fe, and a semiconductive elastic layer 9*a* covering an outer peripheral surface of the metal core may be used as the transfer roller 9. It is preferred that the semiconductive elastic layer 9*a* be adjusted to a resistance value of from about $1.0\times10^{6}\Omega$ to about $1.0\times10^{10}\Omega$, for example, with an electron conductive agent such as carbon black or an ion conductive agent. A non-limiting specific configuration example of such transfer roller is an ion conductive elastic roller including the metal core 9*b* and the elastic layer 9*a* having conductivity obtained by causing a NBR rubber to react with a surfactant or the like, which covers the outer peripheral surface of the metal core. In addition, a preferred resistance value of the transfer roller falls with the range of from $1\times10^{8}\Omega$ to $5\times10^{8}\Omega$. This value is a resistance value when a voltage of 2 kV is applied between the metal core of the transfer roller and a metal drum under a state in which the transfer roller is pressed against the metal drum with a load of 500 gf.

The resistance value of the transfer roller 9 is liable to fluctuate depending on the temperature and humidity of an ambient environment, and the resistance fluctuation of the transfer roller 9 results in the occurrence of transfer failure, paper marks, and the like. In view of the foregoing, it is preferred to measure the resistance value of the transfer roller 9 and appropriately control the transfer voltage applied to the transfer roller 9 in accordance with the measurement results (applied transfer voltage control) in order to prevent the occurrence of transfer failure, paper marks, and the like caused by the resistance fluctuation of the transfer roller 9.

An example of the applied transfer voltage control is active transfer voltage control (ATVC) disclosed in Japanese Patent Application Laid-Open No. H02-123385. The ATVC is a method of optimizing the transfer bias applied to the transfer roller at the time of transfer and prevents the occurrence of transfer failure and paper marks. With such transfer bias, a constant current bias is applied from the transfer roller 9 to the drum 1 during the pre-rotation process of the image forming apparatus, and the resistance value of the transfer roller 9 is detected from the bias value thereof. Then, at the time of transfer during a printing process, the transfer bias corresponding to the resistance value is applied to the transfer roller 9. It is preferred to use the above-mentioned ATVC also in this embodiment.

Heating Device

Figure 1:
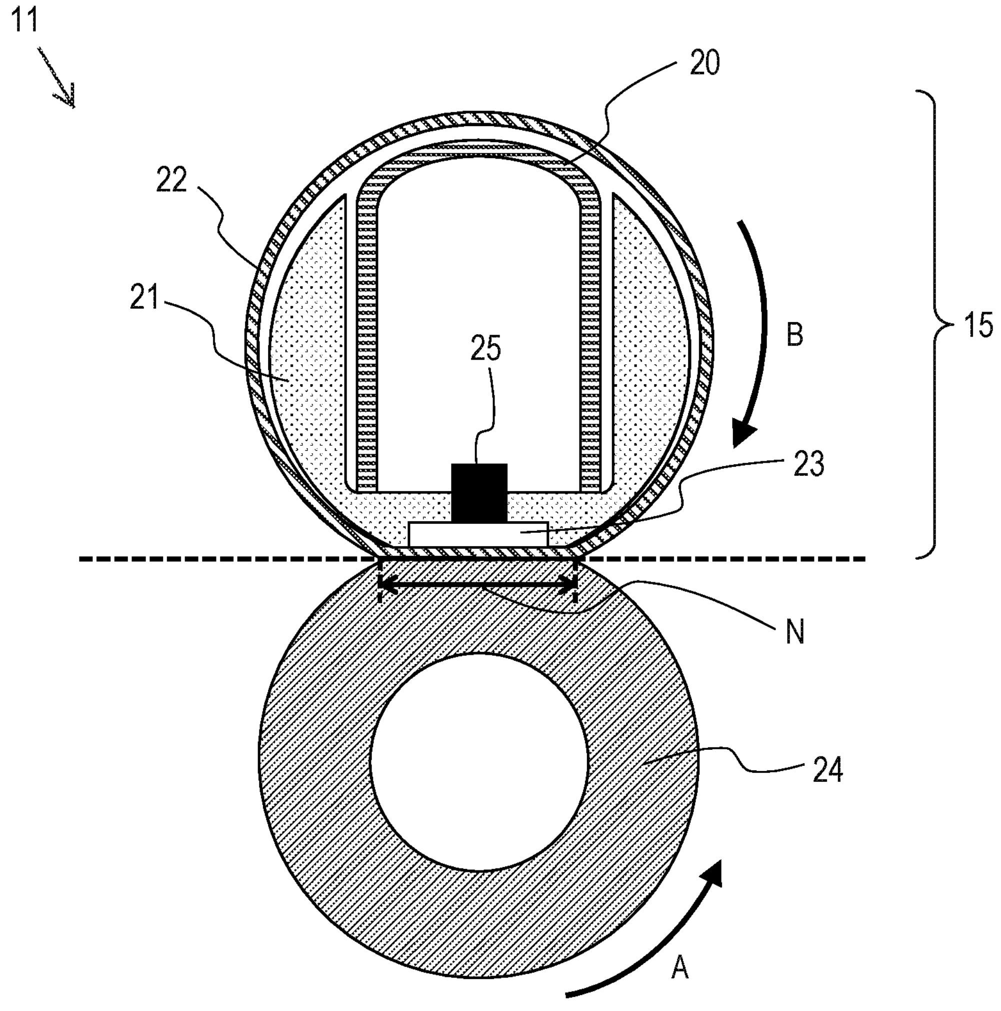
FIG. 1 is a schematic sectional view of a heating device including a heating sliding portion according to one aspect of the present disclosure.

Next, the heating device in this embodiment is described. The heating device according to this embodiment includes a rotating member for heating, an opposing member, which is arranged so as to be opposed to the rotating member, and forms a nip portion together with the rotating member; and a biasing member, which is arranged inside the rotating member, has an opposing surface with respect to an inner peripheral surface of the rotating member, and biases the rotating member to the opposing member. First, a film heating type heating device including a sliding portion inside a rotating member for heating that is directly heated by a heating source is described as an example. FIG. 1 is a schematic sectional view of a film heating type heating device 11 according to this embodiment. The heating device is, for example, a so-called tension-less type heating device disclosed in Japanese Patent Application Laid-Open No. H04-044075. The heating device 11 includes a heating film unit 15 including a rotating member for heating, and a pressure roller 24 serving as a pressure member.

[Heating Film Unit]

The heating device 11 according to one aspect of the present disclosure uses a heating film (heat-resistant fixing film) 22 having an endless shape as a rotating member for heating that is directly heated by a heating source (hereinafter sometimes referred to as "heating body"). With this configuration, heat capacity can be reduced, and quick start performance can be improved. The heating device 11 in this embodiment has a configuration in which at least part of the peripheral length of the heating film 22 is always in a tension-free state (state in which no tension is applied), and the heating film 22 is driven to rotate with the rotational drive force of the pressure roller 24. As illustrated in FIG. 1, the heating film unit 15 includes the heating film 22, a stay 21, a U-shaped sheet metal 20, and a heating body (heater) 23.

(Heating Film)

The heating film 22 is externally fitted to the heating body 23 and the stay 21 serving as a guide member that guides the heating film 22. The inner peripheral length of the heating film 22 is larger than the outer peripheral length of the stay 21 including the heating body 23 by, for example, about 3 mm. Accordingly, the heating film 22 is externally fitted to the stay 21 with a margin in peripheral length.

The thickness of the heating film 22 is preferably 100 μm or less, more preferably 20 μm or more and 50 μm or less from the viewpoint of heat capacity and quick start performance. A monolayer film of, for example, polytetrafluoroethylene (PTFE), a tetrafluoroethylene-perfluoroether copolymer (PFA), or a tetrafluoroethylene-hexafluoropropylene copolymer (FEP), which has heat resistance, may be used as the heating film 22. Alternatively, a multilayer film obtained by coating an outer peripheral surface of a film of, for example, polyimide, polyamide imide, polyether ether ketone (PEEK), polyethersulfone (PES), or polyphenylene sulfide (PPS) with PTFE, PFA, FEP, or the like may also be used as the heating film 22.

(Guide Member and Backup Member)

The stay 21 is a film guide serving as a guide member and is formed of a heat-resistant and rigid member that concurrently holds the heating body 23 and guides the heating film 22. Specifically, the stay 21 is made of a highly heat-resistant resin, such as polyimide, polyamideimide, PEEK, PPS, or a liquid crystal polymer, or a composite material of these resins with ceramics, a metal, glass, and the like. In the heating device illustrated in FIG. 1, the stay 21 also functions as a biasing member that biases the heating film 22 to the pressure roller 24. In addition, the U-shaped sheet metal 20 is a backup member that reinforces the stay 21 and is formed of a rigid member made of a metal, such as stainless steel (SUS) or iron. The heating body 23 is arranged on a lower surface of the stay 21 along the longitudinal direction of the stay (direction intersecting the conveyance direction of the recording medium).

(Heating Body)

Figure 3:
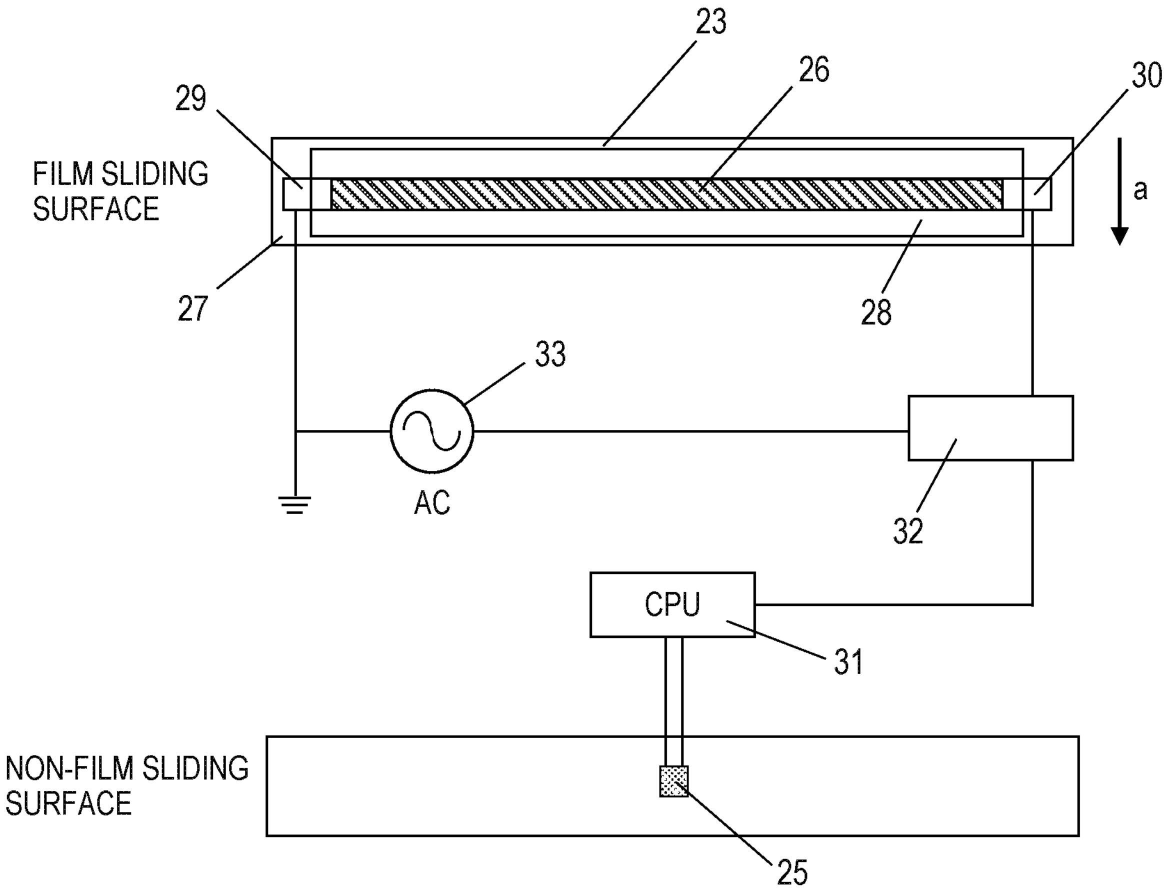
FIG. 3 is a front view of a heating body according to one aspect of the present disclosure and a schematic view for illustrating an energization control circuit thereof

The heating body 23 is generally a heater, for example, a ceramic heater. In the heating device illustrated in FIG. 1, the heating body 23 also functions as a biasing member that biases the heating film 22 to the pressure roller 24. FIG. 3 is a front view of the heating body 23 in this embodiment and a schematic view for illustrating an energization control circuit thereof. The heating body 23 is arranged on a substrate 27 having heat resistance, an insulation property, and satisfactory heat conductivity serving as a material to be heated. The substrate 27 is an elongated member having a longitudinal direction in a direction perpendicular to a conveyance direction "a" of the recording medium. That is, a resistance heating element 26 formed and arranged along the longitudinal direction of the substrate is provided on a front surface (film sliding surface) side of the substrate 27. In addition, the heating body 23 includes a heat-resistant overcoat layer 28 having the resistance heating element 26 formed thereon, which protects the front surface of the heating body, and power supply electrodes 29 and 30 in end portions in the longitudinal direction of the resistance heating element 26. Thus, the heating body having low heat capacity as a whole is formed.

The resistance heating element 26 of this embodiment may be obtained, for example, by forming a paste prepared by kneading silver, palladium, glass powder (inorganic binder), and an organic binder into a belt shape on the substrate 27 by screen printing. In addition to silver palladium (Ag/Pd), an electric resistance material, such as $RuO_2$ or $Ta_2N$, may be used as the resistance heating element 26.

The substrate 27 is made of a material having heat resistance and an insulation property, for example, a ceramic material such as alumina or aluminum nitride. The overcoat layer 28 ensures the electrical insulation property between the resistance heating element 26 and the front surface of the heating body 23, and the slidability of the heating film 22.

A plan view of the heating body 23 viewed from a back surface (non-film sliding surface) thereof is illustrated in FIG. 3. For example, an external abutment type thermistor separated from the heating body 23 may be used as a thermometric element 25 that detects the temperature of the heating body 23. The thermometric element 25 has a configuration in which, for example, a heat-insulating layer is formed on a support, an element of a chip thermistor is fixed onto the heat-insulating layer, and the element is directed downward (back surface side of the heating body) to be brought into abutment against the back surface of the heating body with a predetermined pressurizing force. The thermometric element 25 is arranged in a minimum sheet passage area and communicates to a CPU 31. The surface of the overcoat layer 28 covering the heating body 23 is exposed downward and held and fixed on a lower surface side of the stay 21. Through adoption of the above-mentioned configuration, the entire heating body is allowed to have lower heat capacity as compared to that of a heat roller system, and quick start can be performed.

Here, the heating body 23 is increased in temperature when the resistance heating element 26 is caused to generate heat over an entire area in the longitudinal direction by the supply of power to the power supply electrodes 29 and 30 in the end portions in the longitudinal direction of the resistance heating element 26. The increase in temperature is detected by the thermometric element 25, and the output of the thermometric element 25 is A/D converted and taken into the CPU 31. Then, based on the information, the electric power supplied to the resistance heating element 26 by a triac 32 is controlled by phase control, wavenumber control, or the like, and the temperature of the heating body 23 is controlled. That is, the energization is controlled so that the heating body 23 is increased in temperature when the detection temperature of the thermometric element 25 is lower than a predetermined set temperature, and the heating body 23 is decreased in temperature when the detection temperature is higher than the set temperature. Thus, the heating body 23 is kept at a constant temperature at the time of fixing.

Under a state in which the heating body 23 is increased to a predetermined temperature and the rotational peripheral speed of the heating film 22 caused by the rotation of the pressure roller 24 becomes steady, the recording medium is introduced from a transfer portion into a nip portion N formed by the heating body 23 and the pressure roller 24 with the heating film 22 sandwiched therebetween. Then, when the recording medium is held and conveyed through the nip portion N together with the heating film 22, the heat of the heating body 23 is applied to the recording medium through the heating film 22. As a result, an unfixed toner image on the recording medium is heated to be fixed on the recording medium. Then, the recording medium having passed through the nip portion N is separated from the heating film 22 and conveyed.

[Pressure Member]

The pressure roller 24 serving as a pressure member is a film outer surface contact drive unit, which is arranged so as to be opposed to the heating film 22, forms the nip portion N together with the heating film 22, and drives the heating film 22 to rotate. That is, the pressure roller 24 corresponds to an opposing member for the heating film 22. The pressure roller 24 includes a metal core, an elastic layer, and a release layer serving as an outermost layer, and is arranged in pressure contact with the front surface of the heating body 23 with the heating film 22 sandwiched between the pressure roller 24 and the heating body 23 with a predetermined pressing force by a bearing unit and a biasing unit (not shown).

The pressure roller 24 is opposed also to the stay 21 and is driven to rotate at a predetermined peripheral speed in a direction of the arrow A illustrated in FIG. 1 by a drive system (not shown). Through the rotational drive of the pressure roller 24, a friction force between the pressure roller 24 and the outer surface of the heating film 22 in the nip portion N is generated, and a rotational force acts on the heating film 22. Then, the inner peripheral surface side of the heating film 22 is brought into close contact with the front surface (opposing surface) of the heating body 23 in the nip portion N, and the film rotates around the outer periphery of the stay 21 in a direction of the arrow B while being slid with the heating body 23. Thus, in the heating device 11, the inner peripheral surface of the heating film 22 and the opposing surfaces of the stay 21 and the heating body 23 each serving as a biasing member form a sliding portion. A grease composition according to one aspect of the present disclosure is applied to the sliding portion as a lubricant. Because of this, the friction generated mainly in a portion, serving as the sliding portion inside the heating film, of a part of the heating body 23 that is brought into contact with the heating film 22 while being pressurized in the nip portion N and a part of the stay 21 that is brought into contact with the heating film 22 is reduced, and lubricity is maintained. As a result, the heating film 22 is rotated in association with the pressure roller 24 at substantially the same peripheral speed as the rotational peripheral speed of the pressure roller 24. In FIG. 1, there is illustrated an example in which the sliding portion is formed of the inner peripheral surface of the heating film 22, a part of the portion of the stay 21 serving as a biasing member opposed to the inner peripheral surface, and the surface of the heating body 23 opposed to the inner peripheral surface, but the heating device according to one aspect of the present disclosure is not limited to this configuration.

<Grease Composition>

Next, the grease composition according to one aspect of the present disclosure is described. The grease composition according to one aspect of the present disclosure is a fluorine-based grease containing a fluorine-based base oil. The grease composition has a function as a lubricant for reducing the friction in the sliding portions between the heating film 22 and the guide member (stay) 21 and between the heating film 22 and the heating body (heater) 23. That is, the inner peripheral surface of the heating film (rotating member) and the opposing surfaces of the stay and the heating body each serving as a biasing member are brought into contact with each other via the grease composition. The grease composition may be made of only a base oil, but it is preferred that the grease composition be made of a mixture of a base oil and a fluorine-based thickener from the viewpoint that the base oil is retained on the inner peripheral surface of the film for a long period of time. In the grease composition according to one aspect of the present disclosure, the evaporation of the base oil under high temperature at the time of drive of the heating device can be more reliably suppressed by the configuration of the base oil described below.

<Base Oil>

The base oil contained in the grease composition according to one aspect of the present disclosure contains a perfluoropolyether and a fluoropolymer. Each component is described below.

(Perfluoropolyether)

The perfluoropolyether is a component serving as a base material for a lubricant. Regarding the viscosity of the perfluoropolyether, a perfluoropolyether having a kinematic viscosity at a temperature of 40° C. of from 50 cSt to 1,500 cSt (from 0.5 $cm^2/s$ to 15 $cm^2/s$) is used. When the perfluoropolyether having a kinematic viscosity in the above-mentioned range is incorporated into the base oil, the viscosity as a grease composition can be more easily adjusted to a range in which smoother sliding can be maintained while the outflow of the grease composition from the sliding portion is suppressed. In the present disclosure, the kinematic viscosity is a value measured in conformity with ASTM D445: Standard Test Method for Kinematic Viscosity of Transparent and Opaque Liquids (and Calculation of Dynamic Viscosity). The same applies to a fluoropolymer described later.

From the viewpoint of high heat resistance, the perfluoropolyether includes at least one perfluoropolyether selected from the group consisting of: a perfluoropolyether having a structure represented by the following structural formula (2); a perfluoropolyether having a structure represented by the following structural formula (3); and a perfluoropolyether having a structure represented by the structural formula (4). Of those, the perfluoropolyether having the structure represented by the structural formula (3) is particularly suitably used.

Structural formula (2)

$$F\text{—}(\underset{\displaystyle CF_3}{\overset{}{C}}FCF_2O)_k\text{—}CF_2CF_3$$

In the structural formula (2), "k" represents a positive number, and "k" is such a value that the kinematic viscosity at a temperature of 40° C. of the perfluoropolyether satisfies from 50 cSt to 1,500 cSt (from 0.5 $cm^2/s$ to 15 $cm^2/s$).

$$CF_3\text{—}(OCF_2CF_2)_{m1}\text{—}(OCF_2)_{n1}\text{—}CF_3 \quad \text{Structural formula (3)}$$

In the structural formula (3), m1 and n1 each independently represent a positive number, and m1+n1 is such a value that the kinematic viscosity at a temperature of 40° C. of the perfluoropolyether satisfies from 50 cSt to 1,500 cSt (from 0.5 $cm^2/s$ to 15 $cm^2/s$). The value of m1/n1 is preferably from 0.5 to 2.0, more preferably from 0.5 to 1.5, still more preferably from 0.5 to 1.0, particularly preferably 1.0 in order to prevent an extreme increase in viscosity at low temperature and an extreme decrease in viscosity at high temperature.

$$F\text{—}(CF_2CF_2CF_2O)_{n2}\text{—}CF_2CF_3 \quad \text{Structural formula (4)}$$

In the structural formula (4), n2 represents a positive number, and n2 is such a value that the kinematic viscosity at a temperature of 40° C. of the perfluoropolyether satisfies from 50 cSt to 1,500 cSt (from 0.5 $cm^2/s$ to 15 $cm^2/s$).

In general, the perfluoropolyether is an oil having high heat resistance. Because of this, even when the perfluoropolyether is exposed to a high temperature of about 200° C. at the time of heating of the heating device 11, the perfluoropolyether is not decomposed, and the lubricity between the heating film 22 and the heating body 23 can be kept. However, when a commercially available perfluoropolyether having a kinematic viscosity in the above-mentioned range is used in the heating device that reaches a high temperature of about 200° C., there may be a perfluoropolyether that is liable to become ultrafine particles. That is, a perfluoropolyether has a molecular weight distribution, and molecules each having a low molecular weight (hereinafter sometimes referred to as "low-molecular-weight component") in the distribution are liable to become ultrafine particles. Because of this, the ratio of high-molecular-weight molecules that are less liable to become ultrafine particles can be increased by specifying the kinematic viscosity in proportion to an average molecular weight in the above-mentioned range. However, when the ratio of the low-molecular-weight component is large as a molecular weight distribution, the amount of the perfluoropolyether that is liable to become ultrafine particles is also increased.

In view of the foregoing, the inventors have investigated the amount of the low-molecular-weight component that is liable to become ultrafine particles contained in the commercially available perfluoropolyether by thermogravimetric analysis (TGA). That is, the inventors have investigated, in the TGA, the evaporation loss at a point of 260° C. in a thermogravimetric reduction curve obtained when the temperature is increased from 25° C. at 10° C./min under a nitrogen atmosphere. As a result, the evaporation loss including a lot-to-lot variation fell within the range of 0.05 to 2.0 mass %.

The generation amount of ultrafine particles can be suppressed through use of, as the perfluoropolyether, a perfluoropolyether of a grade in which the content of the low-molecular-weight component is low, that is, a perfluoropolyether having an evaporation loss by the above-mentioned thermogravimetric analysis of less than 0.05 mass %. However, in order to reduce the content of the low-molecular-weight component in the perfluoropolyether, it is required to repeat the distillation of the perfluoropolyether, resulting in an increase in cost of the perfluoropolyether.

(Fluoropolymer)

In view of the foregoing, the inventors have made extensive investigations in order to obtain a grease composition that can prevent the generation of ultrafine particles even when the perfluoropolyether in which the content of the low-molecular-weight component is high is used. As a result, it has been found that the use of a fluoropolymer having a structure represented by the following structural formula (1) as a base oil in a grease composition together with the above-mentioned perfluoropolyether is extremely effective for preventing the generation of ultrafine particles caused by the low-molecular-weight component of the perfluoropolyether. That is, the grease composition according to one aspect of the present disclosure contains, as the base oil, a modified perfluoropolyether represented by the following structural formula (1).

Structural formula (1)

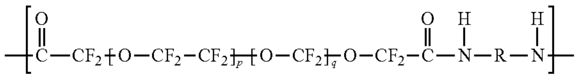

In the structural formula (1), R represents an alkylene group. The alkylene group is not particularly limited, but is, for example, an alkylene group having 6 carbon atoms. In addition, "p" and "q" each independently represent a positive number, and p+q is such a value that a kinematic viscosity at a temperature of 40° C. of the fluoropolymer satisfies from $1.0\times10^5$ cSt to $1.0\times10^7$ cSt (from $1.0\times10^3$ $cm^2/s$ to $1.0\times10^5$ $cm^2/s$). In addition, the value of p/q is preferably from 0.5 to 2.0, particularly preferably from 0.5 to 1.0, further preferably 1.0 from the viewpoint of preventing an extreme increase in viscosity at low temperature and an extreme decrease in viscosity at high temperature.

In addition, when the kinematic viscosity of the fluoropolymer is too low, the fluoropolymer is easily evaporated, and a capturing effect on the perfluoropolyether in the base oil described later is difficult to obtain. Meanwhile, when the kinematic viscosity is too high, the fluoropolymer becomes extremely difficult to handle, and hence the kinematic viscosity at a temperature of 40° C. of the fluoropolymer is required to satisfy from $1.0\times10^5$ cSt to $1.0\times10^7$ cSt. The fluoropolymer satisfying those conditions may be, for example, a fluoropolymer that is commercially available as "Fluorolink PA100E" (product name, manufactured by Solvay Specialty Polymers) in which R in the structural formula (1) represents a hexamethylene group ($—(CH_2)_6—$).

The inventors have assumed the reason why a grease composition containing a base oil that contains the fluoropolymer having the structure represented by the structural formula (1) together with the perfluoropolyether can reduce the generation of ultrafine particles caused by the perfluoropolyether as described below.

Figure 4:
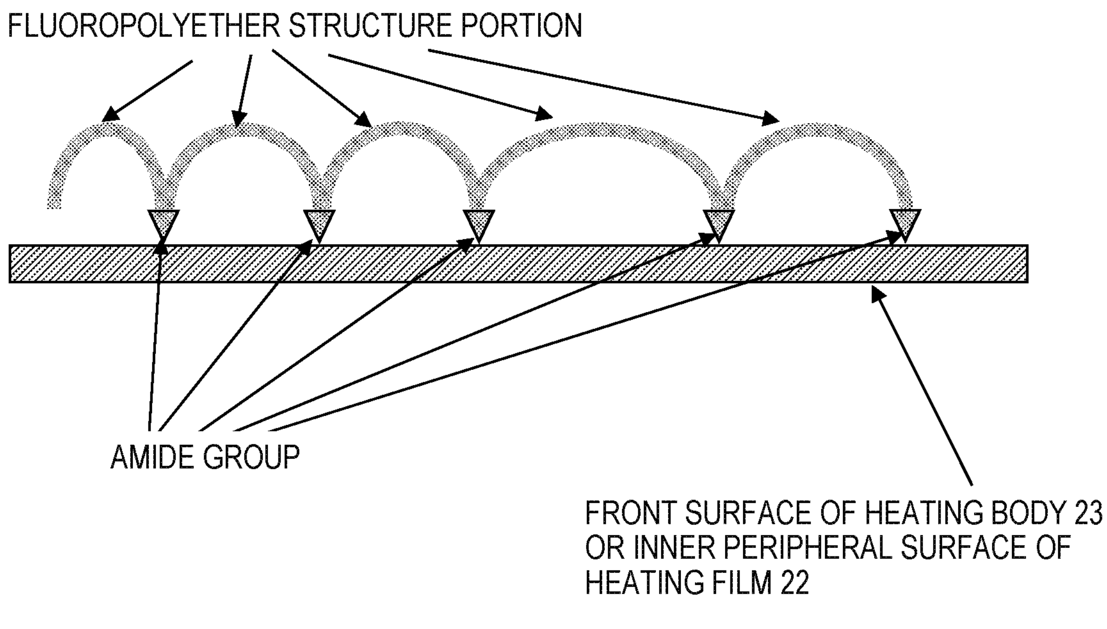
FIG. 4 is a schematic view for illustrating a state of adsorption between a fluoropolymer of the present disclosure and a front surface of the heating body or an inner peripheral surface of a heating film.

In the structure represented by the structural formula (1) of the fluoropolymer, an amide group has strong polarity. Meanwhile, the front surface (opposing surface) of the substrate 27 (heating body 23) and the inner peripheral surface of the heating film 22 each have functional groups such as a hydroxy group exposed on outermost surfaces thereof, and those functional groups also each have polarity. Accordingly, those functional groups and the amide group in the structural formula (1) interact with each other. Because of this, the fluoropolymer is adsorbed to the front surface of the heating body 23 and the inner peripheral surface of the heating film 22 so that a fluoropolyether structure portion in a molecular chain faces an opposite side to the heating body 23 and the heating film 22 as illustrated in FIG. 4. FIG. 4 is a schematic view for illustrating a state in which the fluoropolymer of the present disclosure is adsorbed to the front surface of the heating body (substrate) or the inner peripheral surface of the heating film.

The adsorption is maintained even under high temperature at the time of operation of the heating device. Further, the fluoropolyether structure portion facing outward with respect to the adsorption surface has the same structure as those of perfluoropolyethers represented by the structural formulae (2) to (4) in the base oil and has a high affinity. Because of this, the fluoropolyether structure portion can capture the perfluoropolyethers represented by the structural formulae (2) to (4) in the base oil. As a result, the perfluoropolyethers represented by the structural formulae (2) to (4) are trapped onto the surfaces of the heating body 23 and the heating film 22 through the fluoropolyether structure portion of the fluoropolymer. As a result, the perfluoropolyether is less liable to be evaporated, and the generation of ultrafine particles is suppressed.

In the grease composition according to one aspect of the present disclosure, the content ratio of the fluoropolymer having the structure represented by the structural formula (1) with respect to the total mass of the grease composition preferably falls within the range of 0.1 to 10.0 mass %. When such content ratio is set, the generation of ultrafine particles from the perfluoropolyether can be suppressed effectively at low cost.

(Thickener)

In addition, the grease composition of the present disclosure may also contain a fluorine-based thickener. Specifically, fine particles of a fluororesin, such as PTFE, PFA, or FEP, may be used as the fluorine-based thickener. Those fine particles of the fluororesin can put on the fluorine-based base oil around the fine particles, and hence the base oil can be made difficult to flow out even under high temperature of the heating device. In particular, from the viewpoint of durability, the thickener preferably contains polytetrafluoroethylene fine particles (PTFE fine particles). The particle diameter of each of the fine particles of the fluororesin is preferably from 50 nm to 1 μm from the viewpoint of putting on the fluorine-based base oil. Here, the particle diameter of each of the fine particles of the fluororesin means the average primary particle diameter of the thickener observed with a scanning electron microscope (SEM).

In addition, it is preferred that the mixing ratio between the fluorine-based thickener and the perfluoropolyether that is a fluorine-based oil be set so that the fluorine-based oil is contained in a relatively large amount. Specifically, it is preferred that the thickener be contained in an amount of from 10 parts by mass to 100 parts by mass with respect to 100 parts by mass of the base oil. When the mixing ratio is set as described above, the suppressing effect on friction generated between the heating film and a part of the heating body and the stay can be further exhibited. Further, the grease composition is more easily retained on the inner peripheral surface of the heating film even under high temperature of the heating device, and hence the friction suppressing effect can be exhibited stably over a long period of time.

[Other Embodiments of Heating Device]

(Embodiment Using Pressure Pad as Pressure Member)

Figure 5:
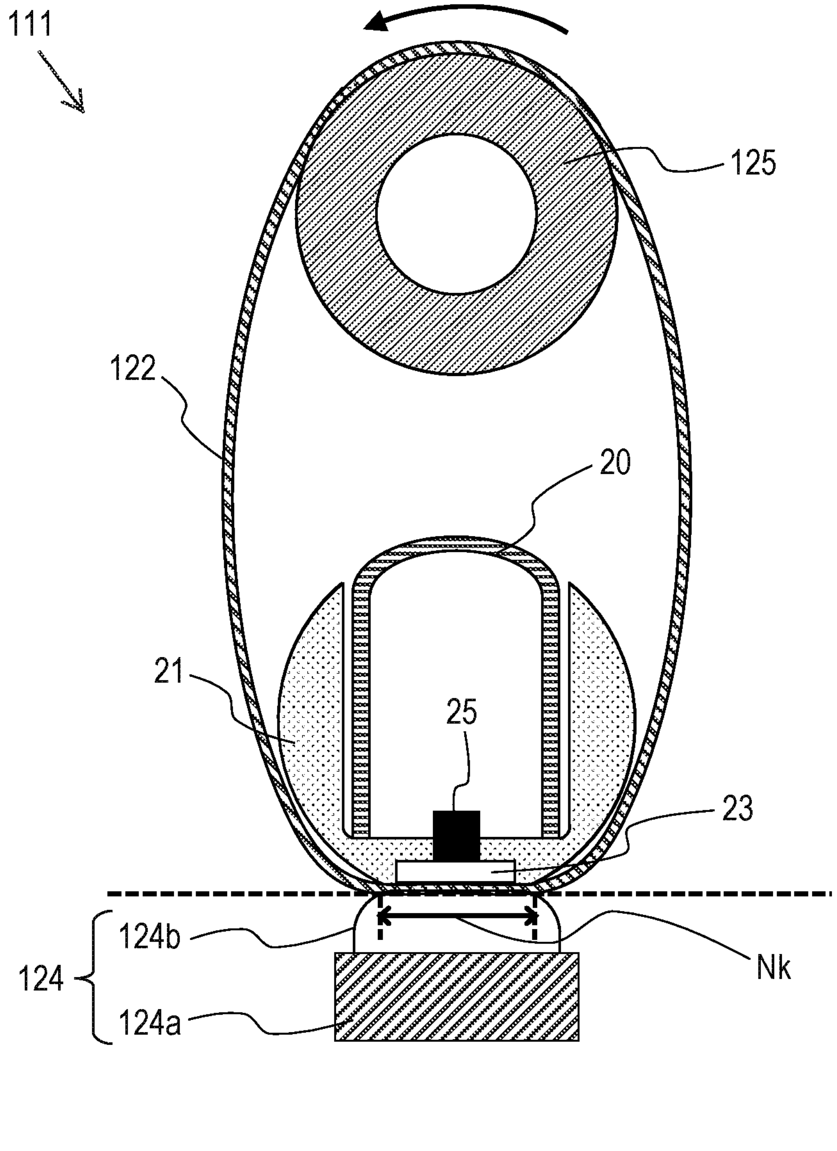
FIG. 5 is a schematic sectional view of a heating device including a pressure pad according to one aspect of the present disclosure.

In the above-mentioned embodiment, the film heating type heating device 11 including, in particular, the sliding portion on the heating side and the pressure roller 24 serving as an opposing member has been described. However, the heating device according to one aspect of the present disclosure may have a configuration including a pressure pad instead of the pressure roller as the opposing member. As an example, there is given is a film heating type heating device 111 including a pressure pad 124 as illustrated in FIG. 5. The film heating type heating device 111 including the pressure pad is the same as the film heating type heating device 11 except for the pressure pad 124, a film drive roller 125, and a heating film 122. That is, the pressure pad 124 is used instead of the pressure roller 24, and hence the drive of the heating film 122 cannot be obtained. For this reason, the heating device 111 includes the film drive roller 125 in order to drive the heating film 122.

The film drive roller 125 is driven by receiving rotational drive from a motor (not shown) and can drive the heating film 122.

Here, the pressure pad 124 includes a pressure pad base **124*a* formed of a rigid member of, for example, a metal, such as stainless steel (SUS) or aluminum, and a pressure pad surface layer 124*b* formed on the pressure pad base 124*a*. The pressure pad surface layer 124*b* is formed of a member having low friction, heat resistance, and elasticity, and heat-resistant resins, such as PTFE, PFE, polyimide, polyamideimide, and aramid, woven and nonwoven fabrics formed of fibers thereof, and the like may be used. In addition, the pressure pad 124 is brought into pressure contact with the heating film 122 by a spring (not shown) in lower portions of longitudinal ends of the pressure pad base 124*a* to form a nip portion Nk together with the heating film 122**.

In addition, the film drive roller 125 is a metal core having a roughened surface in order to drive the heating film 122, and stainless steel (SUS), aluminum, or the like may be used as a metal. In addition, the heating film 122 is the same as the heating film 22 except that the heating film 122 has an inner diameter larger than that of the heating film 22 in order to include the film drive roller 125.

In the same manner as in the heating device 11, the film heating type heating device 111 including the pressure pad as described above also includes, as a sliding portion on a heating side, a sliding portion formed of the inner peripheral surface of the heating film 122, a part of the portion of the stay 21 serving as a biasing member opposed to the inner peripheral surface, and the surface of the heating body 23 opposed to the inner peripheral surface. Accordingly, through use of the grease composition according to one aspect of the present disclosure as a lubricant in the sliding portion, the suppressing effect on the generation of ultrafine particles can be obtained in the same manner as in the heating device 11.

(Embodiment Including Sliding Portion on Pressure Side)

Figure 6:
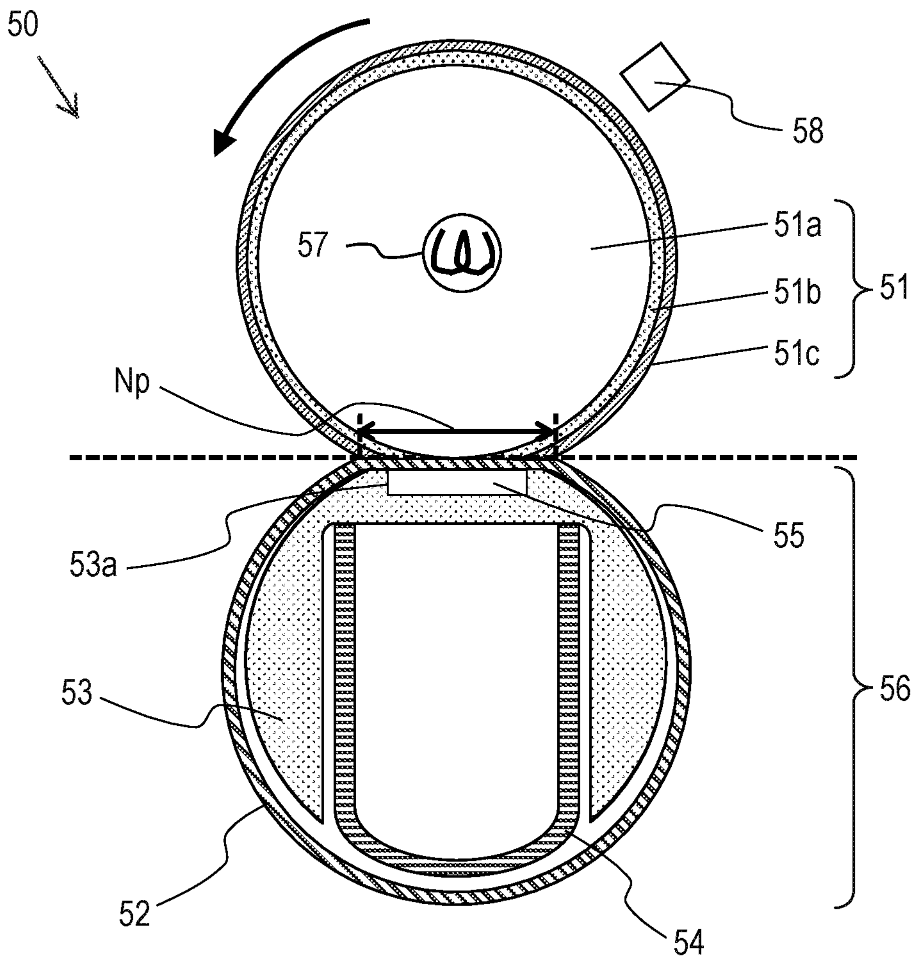
FIG. 6 is a schematic sectional view of a heating device including a pressure sliding portion according to one aspect of the present disclosure.

In each of the above-mentioned embodiments, the film heating type heating device including, in particular, the rotating member that is directly heated by the heating source, that is, the sliding portion on the heating side has been described. However, the grease composition according to one aspect of the present disclosure exhibits the same effects also in a heating device including a rotating member that is indirectly heated by a heating source, that is, including a sliding portion that is slid by rotation with the rotating member on a pressure side. As an example, there may be given a heating device 50 including a pressure film unit illustrated in FIG. 6.

The heating device 50 includes a pressure film unit 56 and a fixing roller 51 serving as an opposing member that is opposed to be brought into pressure contact with the pressure film unit 56 to form a nip portion Np. The fixing roller 51 includes a heating source (heating body) 57 inside and heats the pressure film unit 56 when the fixing roller 51 reaches high temperature. That is, the pressure film unit 56 has a configuration of being indirectly heated by the heating source through the fixing roller 51, and a recording medium bearing a recording material is subjected to heat treatment by passing through the nip portion Np.

The fixing roller 51 includes a cylindrical metal core **51*a* formed of a metal material, such as iron, stainless steel (SUS), or aluminum. In addition, a high thermally-conductive elastic layer 51*b* containing a silicone rubber serving as a base and a thermal conductive filler, such as alumina, metal silicon, silicone carbide, or silica, is formed on the outer peripheral surface of the cylindrical metal core 51*a*. Further, a release layer (outermost layer) 51*c* containing PTFE, PFA, FEP, or the like as a main component is formed on the outer peripheral surface of the elastic layer 51*b*. Bearings (not shown) are externally fitted to both ends of the fixing roller 51. When the bearings are fixed to a device frame, the fixing roller 51** is rotatably fixed to the device frame.

A halogen heater 57 serving as the heating body is built in the fixing roller 51. A temperature-detecting element 58 detects the surface temperature of the fixing roller 51, and a thermopile, a radiation thermometer, or the like may be used as the temperature-detecting element 58. The temperature detected by the temperature-detecting element 58 is fed back to a CPU (not shown), and the halogen heater 57 is controlled for energization by the CPU (not shown) so that the surface temperature of the fixing roller 51 detected by the temperature-detecting element 58 reaches a predetermined temperature.

The pressure film unit 56 includes a pressure film (pressure belt) 52 having an endless shape, a stay 53 serving as a guide member for the pressure film, a U-shaped sheet metal 54 made of a metal serving as a backup member that reinforces the stay 53, and a nip-forming member 55. In addition, pressure film unit flanges (not shown) that regulate the longitudinal position of the pressure film are arranged in both end portions of the stay 53.

The nip-forming member 55 is formed so as to have a rectangular cross-section, and the surface thereof is adjusted to a predetermined roughness. The stay 53 is molded through use of a resin material having heat resistance so that the cross-section thereof has an approximately inverted gutter shape, and supports a nip-forming member 55 also molded with a resin material having heat resistance in a recess 53*a* formed along the longitudinal direction. A pressure film 52 is externally fitted loosely to the outer periphery of the stay 53.

The pressure film 52 includes a base layer formed through use of, as a main component, a heat-resistant resin, such as a polyimide resin, PEEK, or polyetherimide (PEI), or a metal, such as stainless steel (SUS) or nickel, and a release layer formed through use of, as a main component, a fluororesin, such as PFA, PTFE, or FEP, on the outer peripheral surface of the base layer.

The pressure film unit 56 is supported by the device frame when the pressure film unit flanges (not shown) in both the end portions in the longitudinal direction of the stay 53 are supported by the device frame. Further, a pressure spring (not shown) presses the pressure film unit 56 in the direction of the fixing roller 51 through the pressure film unit flanges (not shown). With this configuration, the nip-forming member 55 and the stay 53 are pressed against the fixing roller 51 through the pressure film 52 to form the nip portion Np of the heating device including the pressure film unit 56.

In addition, the inner peripheral surface of the pressure film 52 is slid with the nip-forming member 55 and the stay 53. That is, in the heating device illustrated in FIG. 6, the sliding portion is formed of the inner peripheral surface of the pressure film 52, the surface of the nip-forming member 55 opposed to the inner peripheral surface, and a part of the portion of the stay 53 opposed to the inner peripheral surface. In order to reduce friction in the sliding portion, the grease composition according to one aspect of the present disclosure is applied to the inner peripheral surface of the pressure film 52 as a lubricant.

In the heating device 50, a motor (not shown) is driven to rotate in response to a print command, and the rotation of an output shaft of a drive motor is transmitted to the cylindrical metal core 51*a* of the fixing roller 51 through a predetermined gear mechanism (not shown). As a result, the fixing roller 51 is rotated in a direction of the arrow, and the pressure film 52 is also rotated in association therewith. In addition, the energization of the halogen heater 57 is started by the CPU (not shown) together with the print command, and the energization control is performed so that the temperature-detecting element 58 reaches a predetermined temperature. Then, when the recording medium is caused to pass through the nip portion Np, the recording medium is subjected to heat-fixing treatment in the same manner as in the film heating type heating device.

In the heating device 50 including the pressure film unit 56 as described above, the pressure film unit 56 reaches high temperature by receiving heat from the fixing roller 51 heated by the heating body 57. As a result, the lubricant applied to the inner peripheral surface of the pressure film 52 is also exposed to high temperature. Through use of the grease composition according to one aspect of the present disclosure as a lubricant, such effects that the generation of ultrafine particles in association with the evaporation of the lubricant and the adhesion of ultrafine particles to the inside of the image forming apparatus can be suppressed is obtained in the same manner as in the film heating type heating device.

(Embodiment Including Intermediate Rotating Member)

Figure 7:
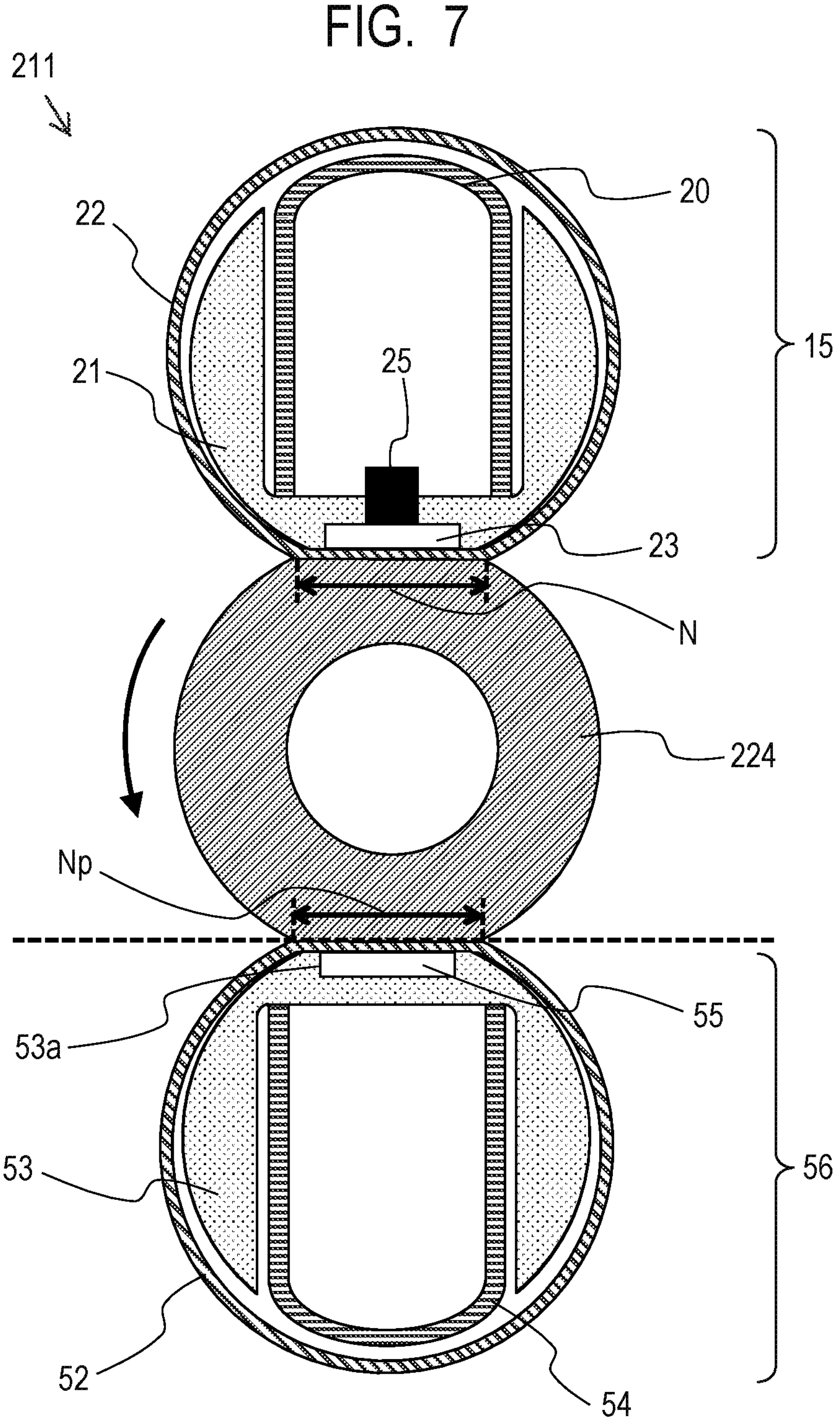
FIG. 7 is a schematic sectional view of a heating device including an intermediate rotating member according to one aspect of the present disclosure.

As still another example of the heating device, there may be given a heating device 211 including an intermediate rotating member 224 as illustrated in FIG. 7. That is, the heating device 211 has a configuration in which the heating device 211 includes the intermediate rotating member 224 serving as an opposing member which the heating film unit 15 is brought into pressure contact with and heats, and the intermediate rotating member 224 is brought into pressure contact with the pressure film unit 56 to form a nip portion Np.

Here, the intermediate rotating member 224 has the same configuration as that of the pressure roller 24 except that the intermediate rotating member 224 has a heat storage layer containing a heat conduction filler between the release layer on the outermost surface and the elastic layer. The heat storage layer is made of a silicone rubber containing a filler having high heat conduction and high heat capacity (e.g., alumina, silicon carbide, silica), and can store heat from the heating film unit 15. With this configuration, when the recording medium is caused to pass through the nip portion Np formed by the intermediate rotating member 224 and the pressure film unit 56, the recording medium is subjected to heat-fixing treatment in the same manner as in the film heating type heating device.

Also in the heating device having such configuration, the grease composition according to one aspect of the present disclosure can be applied as a lubricant to at least one of the heating film unit 15 or the pressure film unit 56. As a result, such effects that the generation of ultrafine particles in association with the evaporation of the lubricant and the adhesion of ultrafine particles to the inside of the image forming apparatus can be suppressed is obtained in the same manner as in the film heating type heating device and the heating device using the pressure film unit.

As the image forming apparatus of this embodiment, the image forming apparatus utilizing an electrophotographic process using a toner as a recording material is described as an example, but an image forming apparatus using a recording material other than a toner may be used. For example, also in an image forming apparatus, such as an inkjet system using ink as a recording material, needless to say, the same effects are exhibited as long as the configuration has a heating device that performs heat treatment on the recording medium having a recording material mounted thereon.

As described above, in the heating device using the grease composition of the present disclosure, the evaporation of the perfluoropolyether in the grease composition at the time of drive of the heating device can be suppressed while an increase in cost and size of the device is suppressed. As a result, the generation of ultrafine particles can be suppressed.

According to one aspect of the present disclosure, a heating device and an electrophotographic image forming apparatus that can prevent the generation itself of ultrafine particles caused by grease can be obtained. In addition, according to another aspect of the present disclosure, a grease composition that can prevent the generation of ultrafine particles even when heated can be obtained.

EXAMPLES

Specific configurations of the fluorine-based grease compositions of the present disclosure and effects in the case of using the compositions in a heating device are described below. In the following description, the term “part(s)” means “part(s) by mass” unless otherwise stated. The kinematic viscosity of each of a fluoropolymer and a perfluoropolyether is a value measured in conformity with ASTM D445 at a temperature of 40° C. In addition, the evaporation loss of the perfluoropolyether is an evaporation loss at a point of 260° C. in a thermogravimetric reduction curve obtained when the temperature is increased from 25° C. at 10° C./min under a nitrogen atmosphere through use of a TGA device (product name: TGA/SDTA851e, manufactured by Mettler Toledo).

Example 1

"Fomblin M60" (product name, manufactured by Solvay Specialty Chemicals) having the structure represented by the structural formula (3) was distilled at a temperature of 240° C. until the evaporation loss reached 2.00 mass %. Then, a perfluoropolyether No. 1 having a kinematic viscosity at a temperature of 40° C. of 310 cSt was prepared. Regarding "Fomblin M60", m1/n1 in the structural formula (3) was 0.8-0.9.

In addition, "Fluorolink PA100E" (product name, manufactured by Solvay Specialty Polymers) was prepared as the fluoropolymer according to one aspect of the present disclosure. "Fluorolink PA100E" had the structure represented by the structural formula (1) in which R represented a hexamethylene group, and p/q=1 was satisfied, and the kinematic viscosity at a temperature of 40° C. thereof was $8.75\times10^5$ cSt. Then, 5.0 parts of the fluoropolymer was diluted 5-fold with a fluorine-based solvent (product name, Novec 7100, manufactured by 3M Company) to prepare a diluted solution.

In addition, PTFE particles (product name, Polyflon PTFE L-5F, manufactured by Daikin Industries, Ltd.) having an average primary particle diameter of 130 nm were prepared as a thickener.

Then, 30.0 parts of the thickener was mixed with 70.0 parts of the perfluoropolyether No. 1 prepared above through use of a kneader to prepare a base grease No. 1. The diluted solution of the fluoropolymer was added to 95.0 parts of the base grease No. 1 so that the addition amount of the fluoropolymer became 5.0 parts, followed by kneading. After that, the kneaded product was left to stand still in a thermostatic bath kept at a temperature of 25° C. for 48 hours to prepare a grease No. 1 formed of the perfluoropolyether, the thickener, and the fluoropolymer.

Example 2

"Fomblin M60" was distilled at a temperature of 240° C. until the evaporation loss reached 0.70 mass % to prepare a perfluoropolyether No. 2 having a kinematic viscosity at a temperature of 40° C. of 320 cSt. Preparation of a base grease No. 2 and preparation of a grease No. 2 were performed in the same manner as in Example 1 except that the obtained perfluoropolyether No. 2 was used.

Example 3

"Fomblin M60" was distilled at a temperature of 240° C. until the evaporation loss reached 0.05 mass % to prepare a perfluoropolyether No. 3 having a kinematic viscosity at a temperature of 40° C. of 350 cSt. Preparation of a base grease No. 3 and preparation of a grease No. 3 were performed in the same manner as in Example 1 except that the obtained perfluoropolyether No. 3 was used.

Example 4

The diluted solution of the fluoropolymer prepared in Example 1 was added to 99.9 parts of the base grease No. 2 so that the addition amount of the fluoropolymer became 0.1 part. A grease No. 4 was prepared in the same manner as in the grease No. 2 except for the foregoing.

Example 5

The diluted solution of the fluoropolymer prepared in Example 1 was added to 90.0 parts of the base grease No. 2 so that the addition amount of the fluoropolymer became 10.0 parts. A grease No. 5 was prepared in the same manner as in the grease No. 2 except for the foregoing.

Example 6

A perfluoropolyether (product name: Krytox GPL107, manufactured by Chemours Company) having the structure represented by the structural formula (2) was distilled at a temperature of 240° C. until the evaporation loss reached 0.70 mass %. Then, a perfluoropolyether No. 4 having a kinematic viscosity at a temperature of 40° C. of 500 cSt was prepared.

A base grease No. 4 was prepared in the same manner as in the base grease No. 1 of Example 1 except that the perfluoropolyether No. 4 thus obtained was used. Then, the diluted solution of the fluoropolymer prepared in Example 1 was added to 95.0 parts of the base grease No. 4 so that the addition amount of the fluoropolymer became 5.0 parts. A grease No. 6 was prepared in the same manner as in the grease No. 1 except for the foregoing.

Example 7

A perfluoropolyether (product name: Demnum S-200, manufactured by Daikin Industries, Ltd.) having the structure represented by the structural formula (4) was distilled at a temperature of 240° C. until the evaporation loss reached 0.70 mass %. Then, a perfluoropolyether No. 5 having a kinematic viscosity at a temperature of 40° C. of 220 cSt was prepared. A base grease No. 5 was prepared in the same manner as in the base grease No. 1 of Example 1 except that the perfluoropolyether No. 5 thus obtained was used. Then, the diluted solution of the fluoropolymer prepared in Example 1 was added to 95.0 parts of the base grease No. 5 so that the addition amount of the fluoropolymer became 5.0 parts. A grease No. 7 was prepared in the same manner as in the grease No. 1 except for the foregoing.

Comparative Example 1

The base grease No. 1 was used as a grease No. C1 according to this Comparative Example. That is, the grease No. C1 does not contain the fluoropolymer having the structure represented by the structural formula (1).

Comparative Example 2

The base grease No. 2 was used as a grease No. C2 according to this Comparative Example. That is, the grease No. C2 does not contain the fluoropolymer having the structure represented by the structural formula (1).

Comparative Example 3

The base grease No. 3 was used as a grease No. C3 according to this Comparative Example. That is, the grease No. C3 does not contain the fluoropolymer having the structure represented by the structural formula (1).

Comparative Example 4

The perfluoropolyether No. 3 prepared in Example 3 was further distilled at a temperature of 240° C. for 60 minutes to prepare a perfluoropolyether No. C1 having an evaporation loss of 0.01 mass %. The kinematic viscosity at a temperature of 40° C. of the perfluoropolyether No. C1 was 370 cSt. A base grease No. C1 was prepared in the same manner as in the base grease No. 1 except that the obtained perfluoropolyether No. C1 was used. Then, the obtained base grease No. C1 was used directly as a grease No. C4 according to this Comparative Example. Accordingly, the grease No. C4 does not contain the fluoropolymer having the structure represented by the structural formula (1).

Comparative Example 5

The base grease No. 4 was used as a grease No. C5 according to this Comparative Example. That is, the grease No. C5 does not contain the fluoropolymer having the structure represented by the structural formula (1).

Comparative Example 6

The base grease No. 5 was used as a grease No. C6 according to this Comparative Example. That is, the grease No. C6 does not contain the fluoropolymer having the structure represented by the structural formula (1).

The formulations and physical properties of the base greases No. 1 to No. 5 and No. C1, the greases No. 1 to No. 7, and the greases No. C1 to No. C6 are shown collectively in Table 1 and Table 2.

TABLE 1

| | Perfluoropolyether (PFPE) | | | | | | |
|---|---|---|---|---|---|---|---|
| Base grease No. | No. | Blending amount (part(s) by mass) | Kinematic viscosity (cSt at 40° C.) | Evaporation loss (mass %) | Structural formula | Product name of PFPE serving as raw material (before distillation) | Thickener (PTFE particles) Blending amount (part(s) by mass) |
| 1 | 1 | 70.0 | 310 | 2.00 | (3) | Fomblin M60 | 30.0 |
| 2 | 2 | 70.0 | 320 | 0.70 | (3) | Fomblin M60 | 30.0 |
| 3 | 3 | 70.0 | 350 | 0.05 | (3) | Fomblin M60 | 30.0 |
| 4 | 4 | 70.0 | 500 | 0.70 | (2) | Krytox GPL 107 | 30.0 |
| 5 | 5 | 70.0 | 220 | 0.70 | (4) | Demnum S-200 | 30.0 |
| C1 | C1 | 70.0 | 370 | 0.01 | (3) | Fomblin M60 | 30.0 |

TABLE 2

| | | | Base grease | | Fluoropolymer |
|---|---|---|---|---|---|
| | | Grease No. | No. | Blending amount (part(s) by mass) | Blending amount (part(s) by mass) |
| Example | 1 | 1 | 1 | 95.0 | 5.0 |
| | 2 | 2 | 2 | 95.0 | 5.0 |
| | 3 | 3 | 3 | 95.0 | 5.0 |
| | 4 | 4 | 2 | 99.9 | 0.1 |
| | 5 | 5 | 2 | 90.0 | 10.0 |
| | 6 | 6 | 4 | 95.0 | 5.0 |
| | 7 | 7 | 5 | 95.0 | 5.0 |
| Comparative Example | 1 | C1 | 1 | 100.0 | 0.0 |
| | 2 | C2 | 2 | 100.0 | 0.0 |
| | 3 | C3 | 3 | 100.0 | 0.0 |

TABLE 2-continued

| | | Base grease | | Fluoropolymer |
|---|---|---|---|---|
| | Grease No. | No. | Blending amount (part(s) by mass) | Blending amount (part(s) by mass) |
| 4 | C4 | C1 | 100.0 | 0.0 |
| 5 | C5 | 4 | 100.0 | 0.0 |
| 6 | C6 | 5 | 100.0 | 0.0 |

The degree of the generation of ultrafine particles was evaluated by a method involving measuring the concentration of ultrafine particles generated directly from the heating device regarding the greases No. 1 to No. 7 according to Examples and the greases No. C1 to No. C6 according to Comparative Examples.

When the heating device is located in an electrophotographic image forming apparatus, the concentration of ultrafine particles that have leaked out of the electrophotographic image forming apparatus is measured instead of the concentration of ultrafine particles generated in the electrophotographic image forming apparatus. Accordingly, the generation amount of ultrafine particles from the heating device itself cannot be measured. In view of the foregoing, in Examples, a temperature controller (not shown) capable of directly energizing the heating body 23 to heat the heating body, and a rotation device (motor) (not shown) capable of rotating the pressure roller 24 were installed in the heating device 11 illustrated in FIG. 1.

Here, the temperature controller is obtained by taking out only the energization control circuit portion for the heating body 23 in the electrophotographic image forming apparatus illustrated in FIG. 3 and can control the heating body 23 to a desired temperature. In addition, the rotation device can rotate the pressure roller 24 at a predetermined peripheral speed (number of revolutions). Here, a specific configuration of the heating device 11 is as described below.

A polyimide film having a thickness of 50 μm coated with PTFE on the outer peripheral surface was used as the heating film 22. The outer diameter of the heating film 22 was set to 18 mm.

A pressure roller including a metal core made of aluminum, an elastic layer made of a silicone rubber, and a release layer formed of a PFA tube was used as the pressure roller 24. The outer diameter of the pressure roller 24 was set to 20 mm, the thickness of the elastic layer was set to 3 mm, and the thickness of the release layer was set to 30 μm.

An alumina substrate having a width of 7 mm, a length of 270 mm, and a thickness of 1 mm was used as the substrate 27. Then, a paste prepared by kneading silver, palladium, glass powder, and an organic binder was formed into a belt shape on the substrate 27 by screen printing to produce the resistance heating element 26. The resistance value of the resistance heating element 26 was set to 20Ω at normal temperature. Further, a heat-resistant glass layer having a thickness of about 50 μm was formed as an overcoat layer 28, and power supply electrodes 29 and 30 were attached through use of a screen printing pattern of silver palladium to produce a ceramic heater 23. An external abutment type thermistor formed by laminating a highly heat-resistant liquid crystal polymer serving as a support and ceramic paper serving as a heat-insulating layer was used as the thermometric element 25.

The electric power supplied to the resistance heating element 26 by the triac 32 was controlled by phase control, and the voltage output from an AC power source 33 was varied in 21 stages between 0% to 100% in increments of 5%. Here, the output of 100% means an output when the heating body 23 is fully energized.

Then, the grease prepared in each of the above-mentioned Examples and Comparative Examples was subjected to evaluation as described below.

That is, a heating device in which 250 mg of the grease to be evaluated was applied onto the surface of the ceramic heater 23 was placed in a chamber having an internal volume of 4.5 $m^3$ under an environment at room temperature (23° C.). Then, the ceramic heater was energized to be heated by the temperature controller so that the detection temperature of the thermometric element 25 on the ceramic heater 23 became 200° C. In addition, the pressure roller was rotated through use of the rotation device so that the process speed (peripheral speed of the pressure roller) became 200 mm/s. Then, the concentration of ultrafine particles in the chamber after an elapse of 10 minutes from the start of energization of the ceramic heater was measured through use of Fast Mobility Particle Sizer (FMPS) "Model 3091" (product name, manufactured by TSI) to calculate the number of ultrafine particles per unit volume (1 $m^3$). The results are shown in Table 3.

TABLE 3

| | Number of ultrafine particles (pieces/$m^3$) |
|---|---|
| Example 1 | 5,500 |
| Example 2 | 5,000 |
| Example 3 | 4,500 |
| Example 4 | 5,100 |
| Example 5 | 5,000 |
| Example 6 | 4,700 |
| Example 7 | 5,200 |
| Comparative Example 1 | 8,500 |
| Comparative Example 2 | 7,500 |
| Comparative Example 3 | 6,500 |
| Comparative Example 4 | 5,500 |
| Comparative Example 5 | 7,300 |
| Comparative Example 6 | 8,700 |

As is understood from Table 3, in any of the greases No. 1 to No. 3 according to Examples 1 to 3 in which 5.0 mass % of the fluoropolymer having the structure represented by the structural formula (1) was mixed with the greases No. C1 to No. C3 according to Comparative Examples 1 to 3, respectively, a significant decrease in concentration of ultrafine particles was recognized.

In addition, it is understood from the comparison of the results of Examples 1 to 3 that the concentration of ultrafine particles becomes lower when the evaporation loss of the perfluoropolyether is smaller.

In addition, from the results of Example 4, a suppressing effect on the generation of ultrafine particles was recognized even when the content ratio of the fluoropolymer having the structure represented by the structural formula (1) in the grease was 0.1 mass %.

Further, it was understood from the results of Examples 2, 6, and 7 that the suppressing effect on the generation of ultrafine particles exhibited by the fluoropolymer having the structure represented by the structural formula (1) was effective for any of the perfluoropolyethers represented by the structural formulae (2) to (4).

Meanwhile, the grease No. C4 according to Comparative Example 4 did not contain the fluoropolymer having the structure represented by the structural formula (1), but the generation of ultrafine particles was able to be suppressed to the same degree as those of Examples. However, it is required to perform purification until the evaporation loss of the perfluoropolyether became 0.01 mass %, and such purification leads to an increase in cost.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-048347, filed Mar. 24, 2022, and Japanese Patent Application No. 2023-039697, filed Mar. 14, 2023 which are hereby incorporated by reference herein in their entirety.

What is claimed is:

1. A heating device comprising:

a rotating member for heating;

an opposing member, which is arranged so as to be opposed to the rotating member, and forms a nip portion together with the rotating member; and a biasing member, which is arranged inside the rotating member, has an opposing surface with respect to an inner peripheral surface of the rotating member, and is configured to bias the rotating member to the opposing member, the inner peripheral surface and the opposing surface being brought into contact with each other via a grease composition to form a sliding portion, the grease composition containing a base oil, the base oil containing a fluoropolymer and a perfluoropolyether, the fluoropolymer having a structure represented by the following formula (1):

formula (1)

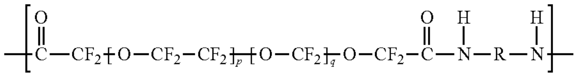

in formula (1), R represents an alkylene group, p and q each independently represent a positive number, and p+q is such a value that a kinematic viscosity at a temperature of 40° C. of the fluoropolymer satisfies from $1.0\times10^3$ $cm^2/s$ to $1.0\times10^5$ $cm^2/s$, the perfluoropolyether having an evaporation loss of 0.05 to 2.0 mass % at a point of 260° C. in a thermogravimetric reduction curve obtained when the perfluoropolyether is increased in temperature from 25° C. at 10° C./min under a nitrogen atmosphere, having a kinematic viscosity at a temperature of 40° C. of from 0.5 $cm^2/s$ to 15 $cm^2/s$, and including at least one perfluoropolyether selected from the group consisting of a perfluoropolyether having a structure represented by the following formula (2); a perfluoropolyether having a structure represented by the following formula (3); and a perfluoropolyether having a structure represented by the following formula (4):

formula (2)

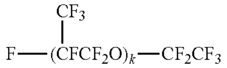

in formula (2), k represents a positive number, and k is such a value that the kinematic viscosity at a temperature of 40° C. of the perfluoropolyether satisfies from 0.5 $cm^2/s$ to 15 $cm^2/s$;

$$CF_3—(OCF_2CF_2)_{m1}—(OCF_2)_{n1}—CF_3 \quad \text{formula (3)}$$

in formula (3), m1 and n1 each independently represent a positive number, and m1+n1 is such a value that the kinematic viscosity at a temperature of 40° C. of the perfluoropolyether satisfies from 0.5 $cm^2/s$ to 15 $cm^2/s$;

$$F—(CF_2CF_2CF_2O)_{n2}—CF_2CF_3 \quad \text{formula (4)}$$

in formula (4), n2 represents a positive number, and n2 is such a value that the kinematic viscosity at a temperature of 40° C. of the perfluoropolyether satisfies from 0.5 $cm^2/s$ to 15 $cm^2/s$.

2. The heating device according to claim 1, wherein the rotating member is a heating film having an endless shape, the opposing member is a pressure roller, the biasing member includes a guide member configured to guide the heating film and a heating body configured to heat the heating film, the guide member and the heating body being arranged inside the heating film, and wherein the sliding portion is formed of at least an inner peripheral surface of the heating film and a surface of the heating body opposed to the inner peripheral surface.

3. The heating device according to claim 1, wherein a content ratio of the fluoropolymer to a total mass of the grease composition is 0.1 to 10.0 mass %.

4. The heating device according to claim 1, wherein p/q in formula (1) is from 0.5 to 2.0.

5. The heating device according to claim 1, wherein the perfluoropolyether includes a perfluoropolyether having the structure represented by formula (3) in which m1/n1 is from 0.5 to 2.0.

6. The heating device according to claim 1, wherein the grease composition further contains polytetrafluoroethylene fine particles.

7. The heating device according to claim 6, wherein the grease composition contains the polytetrafluoroethylene fine particles in an amount of from 10 parts by mass to 100 parts by mass with respect to 100 parts by mass of the base oil.

8. An electrophotographic image forming apparatus comprising a heating device, the heating device including:

a rotating member for heating;

an opposing member, which is arranged so as to be opposed to the rotating member, and forms a nip portion together with the rotating member; and a biasing member, which is arranged inside the rotating member, has an opposing surface with respect to an inner peripheral surface of the rotating member, and is configured to bias the rotating member to the opposing member, wherein the inner peripheral surface and the opposing surface are brought into contact with each other via a grease composition to form a sliding portion, the grease composition contains a base oil, the base oil contains a fluoropolymer and a perfluoropolyether, the fluoropolymer has a structure represented by the following formula (1):

formula (1)

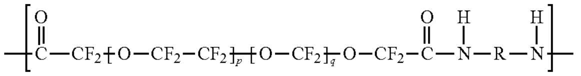

in formula (1), R represents an alkylene group, p and q each independently represent a positive number, and p+q is such a value that a kinematic viscosity at a temperature of 40° C. of the fluoropolymer satisfies from $1.0\times10^3$ $cm^2/s$ to $1.0\times10^5$ $cm^2/s$;

the perfluoropolyether having an evaporation loss of 0.05 to 2.0 mass % at a point of 260° C. in a thermogravimetric reduction curve obtained when the perfluoropolyether is increased in temperature from 25° C. at 10° C./min under a nitrogen atmosphere, having a kinematic viscosity at a temperature of 40° C. of from 0.5 $cm^2/s$ to 15 $cm^2/s$, and including at least one perfluoropolyether selected from the group consisting of a perfluoropolyether having a structure represented by the following formula (2); a perfluoropolyether having a structure represented by the following formula (3); and a perfluoropolyether having a structure represented by the following formula (4):

formula (2)

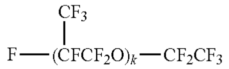

in formula (2), k represents a positive number, and k is such a value that the kinematic viscosity at a temperature of 40° C. of the perfluoropolyether satisfies from 0.5 $cm^2/s$ to 15 $cm^2/s$;

$$CF_3—(OCF_2CF_2)_{m1}—(OCF_2)_{n1}—CF_3 \quad \text{formula (3)}$$

in formula (3), m1 and n1 each independently represent a positive number, and m1+n1 is such a value that the kinematic viscosity at a temperature of 40° C. of the perfluoropolyether satisfies from 0.5 $cm^2/s$ to 15 $cm^2/s$;

$$F—(CF_2CF_2CF_2O)_{n2}—CF_2CF_3 \quad \text{formula (4)}$$

in formula (4), n2 represents a positive number, and n2 is such a value that the kinematic viscosity at a temperature of 40° C. of the perfluoropolyether satisfies from 0.5 $cm^2/s$ to 15 $cm^2/s$.

9. A grease composition comprising:

a base oil containing a fluoropolymer and a perfluoropolyether, the fluoropolymer having a structure represented by the following formula (1):

formula (1)

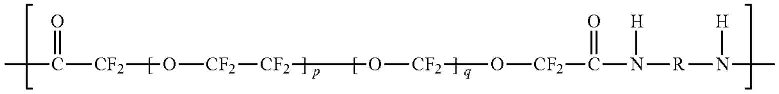

in formula (1), R represents an alkylene group, p and q each independently represent a positive number, and p+q is such a value that a kinematic viscosity at a temperature of 40° C. of the fluoropolymer satisfies from $1.0\times10^3$ $cm^2/s$ to $1.0\times10^5$ $cm^2/s$;

the perfluoropolyether having an evaporation loss of 0.05 to 2.0 mass % at a point of 260° C. in a thermogravimetric reduction curve obtained when the perfluoropolyether is increased in temperature from 25° C. at 10° C./min under a nitrogen atmosphere, having a kinematic viscosity at a temperature of 40° C. of from 0.5 $cm^2/s$ to 15 $cm^2/s$, and including at least one perfluoropolyether selected from the group consisting of a perfluoropolyether having a structure represented by the following formula (2); a perfluoropolyether having a structure represented by the following formula (3); and a perfluoropolyether having a structure represented by the following formula (4):

formula (2)

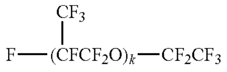

in formula (2), k represents a positive number, and k is such a value that the kinematic viscosity at a temperature of 40° C. of the perfluoropolyether satisfies from 0.5 $cm^2/s$ to 15 $cm^2/s$;

$$CF_3—(OCF_2CF_2)_{m1}—(OCF_2)_{n1}—CF_3 \quad \text{Structural formula (3)}$$

in formula (3), m1 and n1 each independently represent a positive number, and m1+n1 is such a value that the kinematic viscosity at a temperature of 40° C. of the perfluoropolyether satisfies from 0.5 $cm^2/s$ to 15 $cm^2/s$;

$$F—(CF_2CF_2CF_2O)_{n2}—CF_2CF_3 \quad \text{Structural formula (4)}$$

in formula (4), n2 represents a positive number, and n2 is such a value that the kinematic viscosity at a temperature of 40° C. of the perfluoropolyether satisfies from 0.5 $cm^2/s$ to 15 $cm^2/s$.

10. The grease composition according to claim 9, wherein a content ratio of the fluoropolymer to a total mass of the grease composition is 0.1 to 10.0 mass %.

11. The grease composition according to claim 9, wherein p/q in formula (1) is from 0.5 to 2.0.

12. The grease composition according to claim 9, wherein the perfluoropolyether includes a perfluoropolyether having the structure represented by formula (3) in which m1/n1 is from 0.5 to 2.0.

13. The grease composition according to claim 9, further containing polytetrafluoroethylene fine particles.

14. The grease composition according to claim 13, containing the polytetrafluoroethylene fine particles in an amount of from 10 parts by mass to 100 parts by mass with respect to 100 parts by mass of the base oil.

* * * * *